United States Patent [19]
Amasaki et al.

[11] Patent Number: 5,577,216
[45] Date of Patent: Nov. 19, 1996

[54] CONTROLLING PROCESS FOR A CONTROLLING APPARATUS HAVING A CPU AND SPECIAL FUNCTION UNITS

[75] Inventors: Shinichi Amasaki; Teruyo Asai, both of Aichi, Japan

[73] Assignee: Mitsubishi Denki Kabushiki Kaisha, Tokyo, Japan

[21] Appl. No.: 219,874

[22] Filed: Mar. 30, 1994

Related U.S. Application Data

[63] Continuation of Ser. No. 785,069, Oct. 30, 1991, abandoned.

[30] Foreign Application Priority Data

Oct. 31, 1990 [JP] Japan ................................. 2-294504

[51] Int. Cl.$^6$ ............................................. G06F 9/445
[52] U.S. Cl. ................................................. 395/376
[58] Field of Search .................... 364/DIG. 1 MS File, 364/DIG. 2 MS File; 395/200.01, 200.02, 200.03, 200.05, 200.07, 200.08, 200.16, 375, 800

[56] References Cited

U.S. PATENT DOCUMENTS 4,937,777  6/1990  Flood et al. ............................. 395/700

FOREIGN PATENT DOCUMENTS 0312611  4/1989  European Pat. Off. .
3242631  5/1983  Germany .

OTHER PUBLICATIONS

Database WPI Week 7806, 1978. Derwent Publications Ltd., Longon, GB; AN 78-B0991A & CA-A-1 024 656 (General Electric Co.) 17 Jan. 19787. Abstract.

*Primary Examiner*—Robert B. Harrell
*Attorney, Agent, or Firm*—Sughrue, Mion, Zinn, Macpeak & Seas

[57] ABSTRACT

A method for controlling a control apparatus such as a programmable controller which includes a CPU and special function modules. The CPU conducts sequence control and the special function modules perform control other than sequence control in accordance with commands from the CPU. Each instruction represents a normal or special instruction. Special instructions include a first symbol denoting a special function unit-corresponding instruction and a second symbol denotes a special function type (independent of memory addresses). Once the CPU identifies a special function instruction by identifying the first symbol, the CPU stores the contents of the instruction step into a multi-directional access memory of the special function unit. Thereafter, in one embodiment, the CPU generates an interrupt requesting the special function unit to execute this instruction. In other embodiments, the CPU performs instruction processing to ensure, for example, that the instruction is a correct one for the selected special function module. The special function unit decodes and executes the instruction based upon the second symbol denoting the special function type.

8 Claims, 7 Drawing Sheets

FIG.6A
PRIOR ART

ADDRESS

| Address | Content |
|---|---|
| 0 | 1ST CHANNEL CONVERSION MODE |
| 1 | 2ND CHANNEL CONVERSION MODE |
| 2 | 1ST CHANNEL ANALOG COMMAND VALUE |
| 3 | 2ND CHANNEL ANALOG COMMAND VALUE |
| 4 | |
| 5 | |
| 6 | |

41A

2-CHANNEL D/A MODULE

FIG.6B
PRIOR ART

ADDRESS

| Address | Content |
|---|---|
| 0 | 1ST CHANNEL CONVERSION MODE |
| : | : |
| 7 | 8TH CHANNEL CONVERSION MODE |
| 8 | 1ST CHANNEL ANALOG COMMAND VALUE |
| : | : |
| 15 | 8TH CHANNEL ANALOG COMMAND VALUE |
| 16 | |

41B

8-CHANNEL D/A MODULE

FIG.6C
PRIOR ART

ADDRESS

| Address | Content |
|---|---|
| 0 | LINE 1, COLUMN 1 DATA |
| 1 | LINE 1, COLUMN 2 DATA |
| 2 | LINE 1, COLUMN 3 DATA |
| 3 | LINE 1, COLUMN 4 DATA |
| 4 | LINE 1, COLUMN 5 DATA |
| 5 | LINE 1, COLUMN 6 DATA |
| 6 | : |

41C

DISPLAY MODULE

FIG. 9A

| Address | | |
|---|---|---|
| 0 | NUMBER OF SPECIAL FUNCTION MODULE INSTRUCTIONS | 41AB / 420 |
| 1 | SPECIAL FUNCTION MODULE- CORRESPONDING INSTRUCTION 1 | 421 / 421a |
| 2 | | |
| 10 | | |
| 11 | NUMBER OF DEVICE MEMORIES | 421b |
| 12 | DEVICE TYPE | 421c |
| 13 | READ/WRITE SEGMENTATION | 421d |
| 14 | BUFFER MEMORY HEAD ADDRESS | 421e |
| 15 | NUMBER OF PIECES TRANSFERRED | 421f |
| 16 | HANDSHAKE SIGNAL | 421g |
| 17 | EXECUTION CHECKING FLAG | 421h |
| 18 | SPECIAL FUNCTION MODULE- CORRESPONDING INSTRUCTION 2 | 422 |
| : | | 423 |
| | | 424 |
| | | 42m |

| 4 | 430 |
|---|---|
| "Z_ANALOG_1" | 431 |
| 1 | 431b |
| P5H | 431c |
| 1 | 431d |
| 2 | 431e |
| 1 | 431f |
| 0 | 431g |
| 0 | 431h |
| "Z_ANALOG_2" | 432 |
| : | |

| 16 | 440 |
|---|---|
| "Z_ANALOG_1" | 441 |
| 1 | |
| P5H | |
| 1 | |
| 8 | |
| 1 | |
| 0 | |
| 0 | |
| "Z_ANALOG_2" | 442 |
| : | |
| "Z_ANALOG_B" | 448 |
| : | |

| 30 | 450 |
|---|---|
| "Z_PRINT" | 451 |
| | |
| 1 | |
| P6H | |
| 1 | |
| 2 | |
| 1 | |
| 0 | |
| 0 | |
| "Z_LOCATE" | 452 |
| : | |

CONTROLLING PROCESS FOR A CONTROLLING APPARATUS HAVING A CPU AND SPECIAL FUNCTION UNITS

This is a continuation of application No. 07/785,069 filed Oct. 30, 1991, now abandoned.

BACKGROUND OF THE INVENTION

1. Field of the Invention

The present invention relates to a process for controlling a programmable controller or other control apparatus comprising special function units for performing control operations other than sequence control in accordance with commands from a CPU.

2. Description of the Prior Art

Programmable controllers were initially considered merely as a replacement for relays. However, the ease with which these controllers are programmed and their flexibility and functional capacity have expanded the programmable controller's field of application. Accordingly, programmable controllers are now employed not only for sequence (digital) control, but also analog control, position processing, communication processing, and monitoring displays. Sequence control is chiefly performed by a CPU module within the programmable controller. The other controller applications are mainly performed by special function modules. The CPU module also performs integrated control of the entire programmable controller by writing directive data and reading resultant data from the special function modules. Special function modules are essential for control of systems which continue to increase in scale and complexity.

Data transfer between the CPU module and special function modules will now be described.

FIG. 5 illustrates a system configuration diagram of a programmable controller known in the art, which includes a CPU module 1 for controlling the entire programmable controller, a program memory 11 for storing sequence programs, a device memory 12 for storing data employed in and resulting from the sequence programs, and a programming device 2 for writing the sequence programs to be stored in the program memory 11. This system also includes a communication cable 3 for connecting the CPU module 1 and the programming device 2, input/output modules 4, special function modules 4A and two-port memory 41 acting as a bidirectional access memory which allows data transfers between the special function modules 4A and CPU module 1.

FIGS. 6a to 6c provide structural examples of the two-port memory 41. FIG. 6a represents the two-port memory 41A of a two-channel digital-to-analog module. FIG. 6b illustrates a two-port memory 41B of an eight-channel D/A converter module, and FIG. 6c illustrates a two-port memory 41C of a display module.

FIG. 7 sets forth the format for instructions controlling data transfer between the CPU module 1 and the special function modules. The instruction 5 for reading data from the special function module 4A includes an I/O number 51 corresponding to the I/O position at which the special function module 4A is installed, and the head (i.e. first) address 52 of the two-port memory 41 from which data in the special function module 4A is to be read. The CPU instruction also includes a device head address 53 indicating the first address in the device (CPU) memory 12 to which the data is to be written, and the number of data points 54 to be transferred. The instruction 6 for writing data to a special function module includes an I/O number 61 corresponding to the I/O position at which the special function module 4A is installed, the head address 62 of the two-port memory 41 to which the special function module 4A data is to be written, the head device address 63 of the device (CPU) memory 12 from which the data is read, and the number of data points 64 to be transferred.

Examples of instructions for transferring data to the special function module 4A in the CPU module 1 are illustrated in FIG. 8. Instruction 6A writes one data point from the contents of device D0 to address 2 of the two-port memory 41 in the special function module 4A installed in I/O position 50. Instruction 6B writes one data point from the contents of device D0 to address 8 of the two-port memory 41 in the special function module 4A installed in I/O position 50.

However, the prior art includes a limited number of instruction types for the special function modules, such as FROM and TO instructions, which are employed to perform processing with respect to all special function modules. Thus, each instruction may have a different meaning depending upon which two-port memory receives the instruction. For instance, the program 6A sometimes operates as an analog output instruction to the first channel and sometimes as a display instruction, as will be explained below.

The user creates (FIG. 4A) the instructions shown in FIG. 8 with the programming device 2 and writes them to the program memory 11 of the CPU module 1 via the communication cable 3. When running the program step 6A, the CPU module 1 writes the contents of device DO in the device memory 12 to address 2 of the two-port memory 41A, 41B or 41C for the special function module installed in the I/O module at position 50 (which is specified in program 6A). Each special function module interprets this instruction in a different manner.

If a 2-channel D/A conversion module is installed at this I/O module position (the structure for which is set forth in FIG. 6a), the module outputs an analog value corresponding to the contents at address 2 of the two-port memory 41A.

However, if a display module is installed as the special function module 4A, then the instruction 6A represents a program for displaying a character corresponding to the contents of device DO at a display position stored in the buffer memory head address "2". In the example format (FIG. 6) for a display module, this address represents line 1 and column 3. Thus, the display module outputs a character corresponding to the contents at address 2 of the two-port memory 41C.

Program step 6B (FIG. 8) represents an instruction for outputting an analog value corresponding to the contents of device DO to a channel of an eight-channel digital-to-analog converter module (a special function module having eight digital-to-analog conversion facilities) installed in the I/O position 50. In this case, as indicated by the two-port memory structure in FIG. 6b, the contents of device D0 will be written to address 8 of the two-port memory 41B.

The user creates the instruction 6B from the programming device 2 and writes it to the program memory 11 of the CPU module 1 via the communication cable 3. Thereafter, the CPU module 1 writes the contents of device D0 in the device memory 12 to address 8 of the two-port memory 41B in the eight-channel digital-to-analog converter module (FIG. 6B) installed in the I/O position 50 specified in that program 6B. The eight-channel digital-to-analog converter module outputs an analog value corresponding to the contents at address 8 of the two-port memory 41B.

When an analog output is to be provided to the first channel of the digital-to-analog module, the program step will resemble 6A or 6B depending on the number of channels of the digital-to-analog module. Another program is employed if the digital-to-analog converter module includes 16 channels.

The prior art programmable controller controlling process, as described above, has few instruction types for the special function modules which are employed to perform all processing with respect to the special function modules. This has created the following problems: (1) that the same instruction is used to command entirely different operations, (2) that the format of an instruction cannot indicate which operation that instruction represents, since the instruction may differ in format with respect to the same operation, and (3) that when writing a program the addresses of the multi-directional access memory must be considered to ensure that the program step is sent to the correct special function module, which complicates programming.

SUMMARY OF THE INVENTION

It is, accordingly, an object of the present invention to overcome the disadvantages in the prior art by providing a programmable controller controlling process which allows a program to be written without considering the addresses of the multi-directional access memory in the special function module, wherein the operation of an instruction is readily identified from its format, in order to ensure easy program reading.

The programmable controller controlling process of the present invention is concerned with a programmable controller which includes a CPU unit for conducting sequence control and special function units for performing operations other than sequence control in accordance with commands from the CPU unit. A programming device is used to write a program having an instruction step employing a function-symbol identifying the instruction to relate to a special function unit and a type-symbol denoting that type of special function independent of memory addresses, wherein the program is stored in the program memory of the CPU unit. When executing the program, the CPU determines whether a currently executed instruction step relates to a special function unit by testing the function-symbol and stores the contents of the instruction step into a multi-directional access memory of the special function unit. The CPU also requests the special function unit to execute the instruction step. The contents of the instruction in the special function unit are decoded and executed by the special function module based upon the type-symbol stored in the multi-directional access memory.

According to the present invention, a program having an instruction step employing a function-symbol indicating that a special function unit corresponds to the present instruction and a type-symbol denoting a special function type independent of the memory addresses, is written from a programming device and stored into the program memory of the CPU unit. When said instruction step is identified to be a special function instruction (based upon the function-symbol), the contents of the instruction step are stored into the multi-directional access memory of the special function unit. At the same time, the special function unit is requested to execute the instruction step. Finally the contents of the instruction are decoded and executed in the special function unit based upon the type-symbol denoting the special function type, independently of the memory addresses of the instruction step stored in the multi-directional access memory.

A process for controlling a programmable controller which achieves the above objects includes a CPU unit for conducting sequence control and a plurality of special function units for performing control other than sequence control in accordance with commands from said CPU unit, comprising the steps of:

storing information on instructions corresponding to said special function units into multi-directional access memories provided in said individual special function units and accessible also from said CPU unit;

writing a program having an instruction step employing symbols indicating the special function unit-corresponding instruction and a special function type, and storing said program into the program memory of said CPU unit;

executing said program in said CPU unit, determining that said instruction step being executed is concerned with said special function unit-corresponding instruction by means of said symbol indicating said special function unit-corresponding instruction, reading the instruction information stored in said multi-directional access memory of the corresponding special function unit among said plurality of special function units, and requesting said special function unit to execute said instruction step according to said instruction information when said instruction information matches the contents of said instruction step; and executing said instruction according to said instruction information stored in said multi-directional access memory in said special function unit,

BRIEF DESCRIPTION OF THE DRAWINGS

FIGS. 6a, 6b, and 6c give structural examples of multi-directional access memories provided in special function units of the known programmable controller illustrated in FIG. 5.

FIGS. 9a, 9b, 9c, and 9d illustrate examples and the general structure for information stored in the two-port memory of the special function modules.

In the above drawings like reference characters designate like or corresponding parts throughout the different views.

DETAILED DESCRIPTION OF THE PREFERRED EMBODIMENTS

Figure 1:
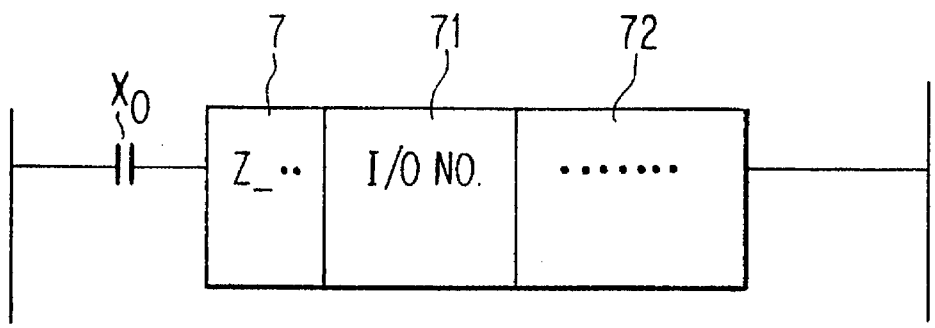
FIG. 1 gives a structural example of a multi-directional access memory provided in a special function unit of a programmable controller as an embodiment employing a process of the present invention.

A first embodiment of the present invention will now be described with reference to FIG. 1–5. The configuration of the programmable controller is similar to that of the programmable controller in FIG. 5 described for the prior art and includes a CPU unit 1, a programming device 2, a special function unit 4, a program memory 11, a device memory 12, and a multi-directional access memory 41.

Figure 5:
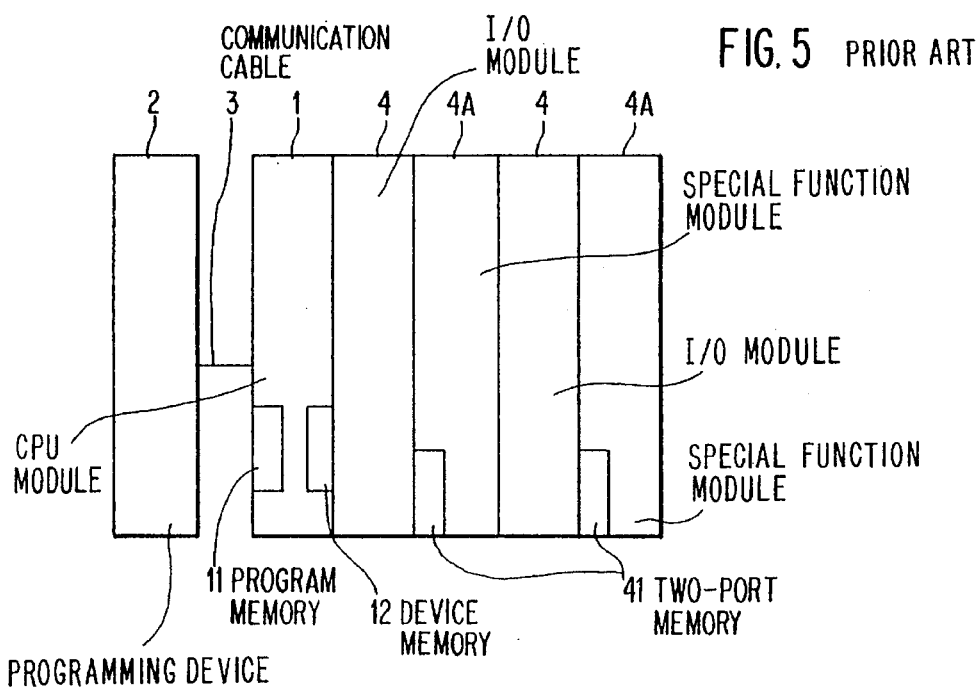
FIG. 5 illustrates a general configuration of a programmable controller.
Figure 7:
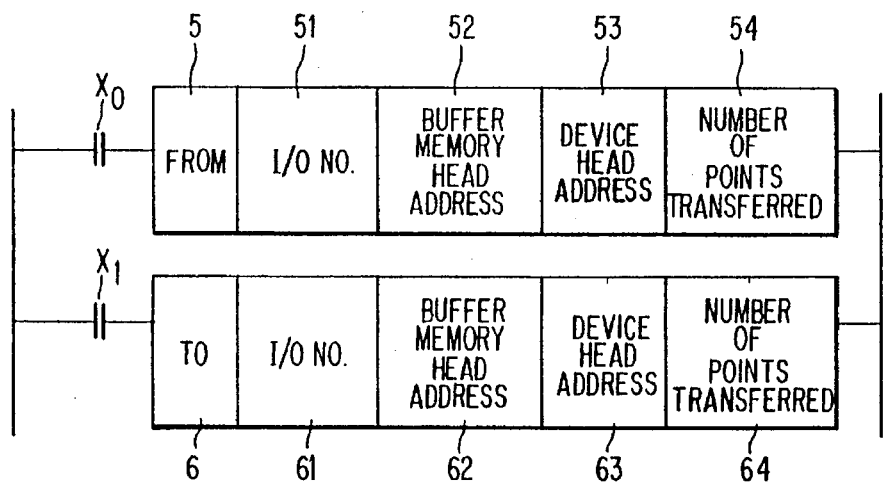
FIG. 7 shows formats of special function unit-corresponding instructions in the prior art, FIG. 8 provides specific examples of the special function unit-corresponding instructions in the prior art.
Figure 8:
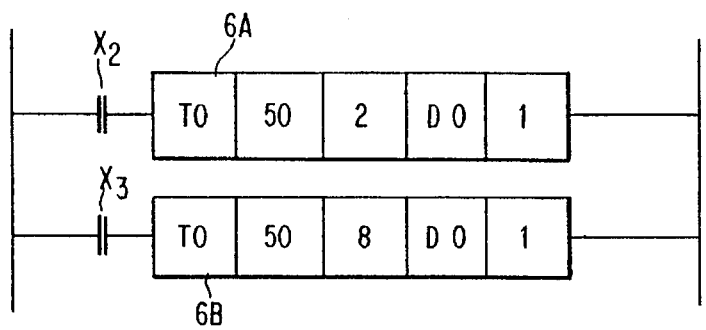

The configuration of the programmable controller is similar to that described in the prior art and shown in FIG. 5 and will not be described again.

FIG. 1 illustrates the format of a special function module instruction 7, wherein "Z_" may be followed by any instruction name. An I/O number 71, which indicates the installation position for the desired special function module, is stored after the instruction name and data 72 is stored after the I/O number.

Figure 2:
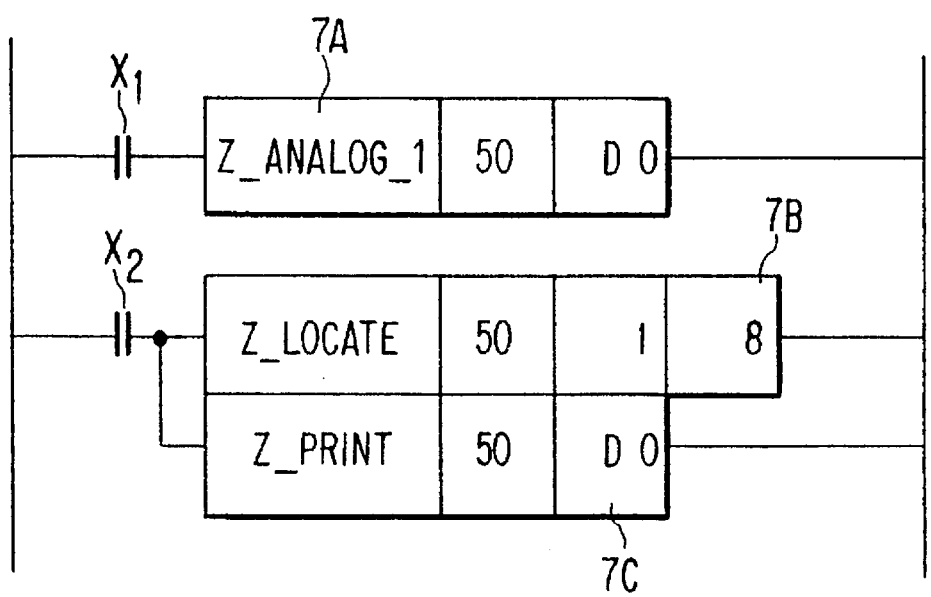
FIG. 2 illustrates formats of special function unit-corresponding instructions.

FIG. 2 illustrates two special function module instructions. Instruction 7A writes the contents of device D0 as an analog output command value to the first channel of the D/A module installed in the I/O position 50. Instruction 7B displays the contents of device D0 on line 0 and in column 3 of the display module installed in I/O position 50.

Figure 3A:
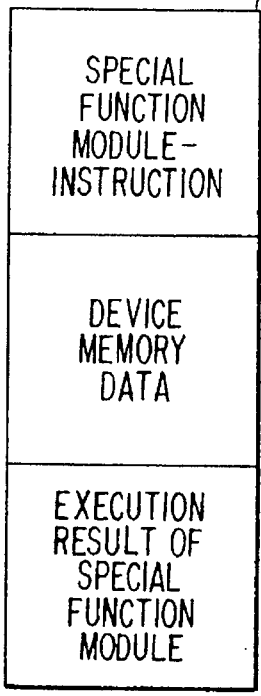
FIGS. 3a, 3b, 3c, 3d and 3e provide specific examples of the special function unit-corresponding instructions.
Figure 3B:
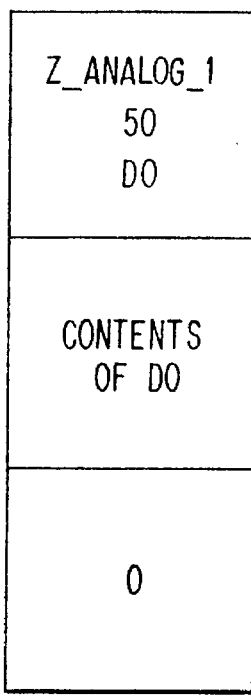
Figure 3C:
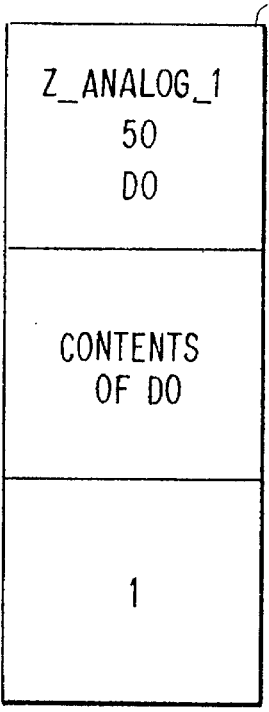
Figure 3D:
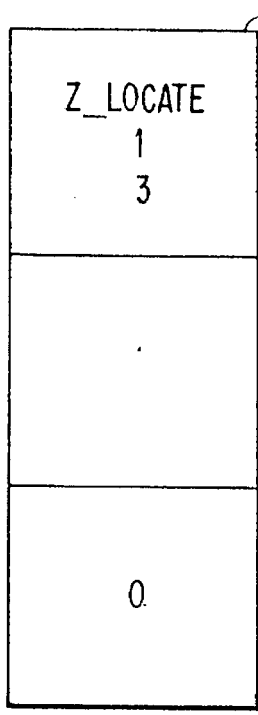
Figure 3E:
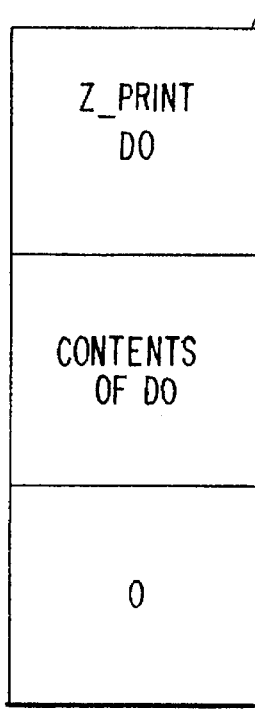
Figure 4:
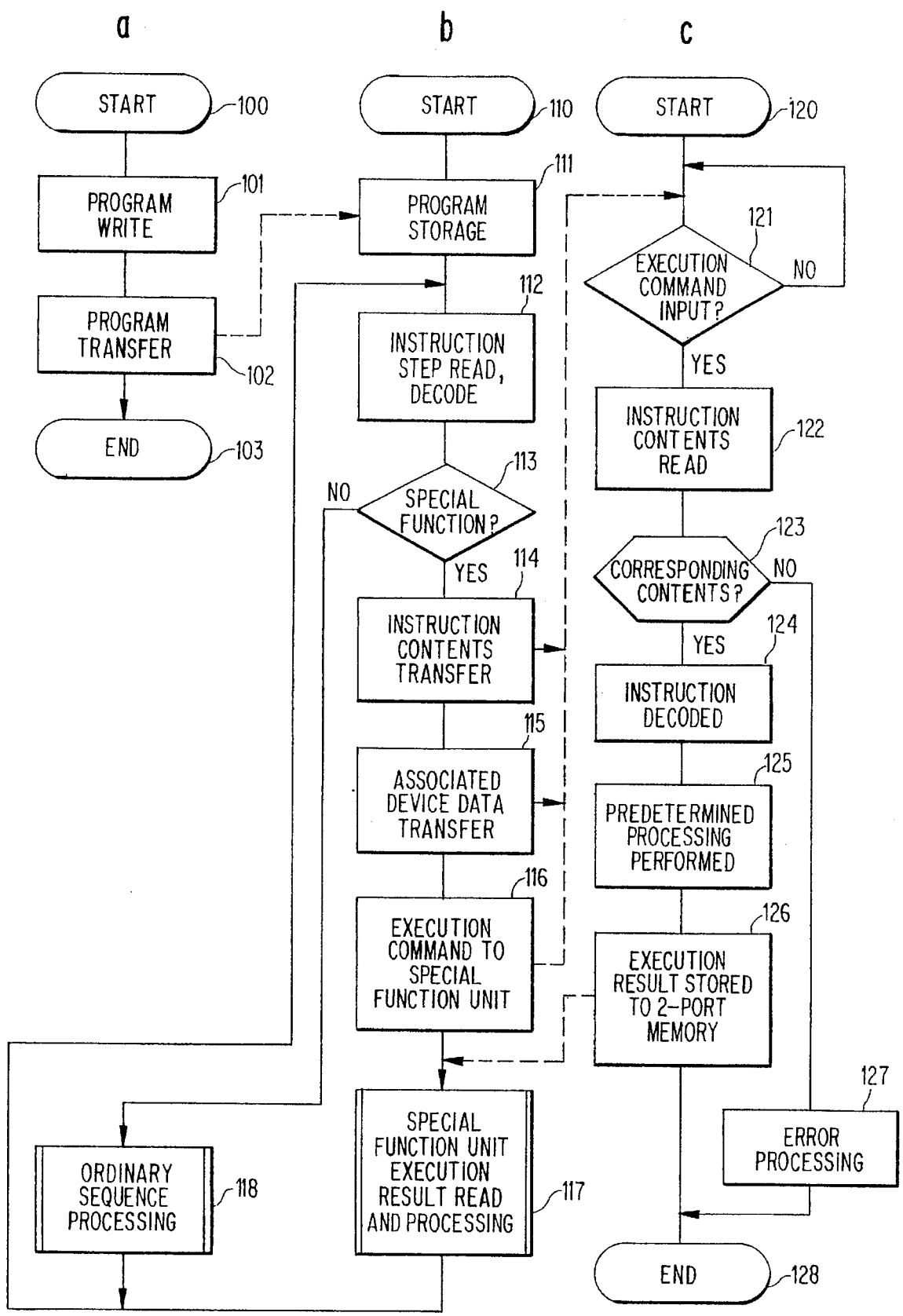
FIGS. 4a, 4b, and 4c are flowcharts showing a sequence of the programmable controller operation.

FIGS. 3a to 3e show the general structure (content) of the two-port memory 41 when functioning as bidirectional access memory accessible from both the CPU module 1 and special function modules 4. FIG. 3a gives a general example of the memory structure in the special function module. FIG. 3b illustrates the memory contents 41BB when an analog output is provided to the first channel of a two-channel or eight-channel D/A module. FIG. 3c illustrates the memory contents 41CC when a display module is accidentally commanded to provide an analog output. FIG. 3d shows the memory contents 41DD when the display position of the display module is to be changed, and FIG. 3e represents memory contents 41EE when the display is provided on the display module.

FIGS. 4a–4c represent flowcharts for operation of the programming device 2, the CPU unit 1 and a special function module 4, respectively. Prior to operation, any instruction names to be accepted as valid for each module during operation are predefined in each special function module 4.

During operation, the user writes each program via the programming device 2 (step 101, FIG. 4a) using the instruction format shown in FIG. 3. This program is stored in program memory 11 in CPU module 1 via the communication cable 3 at step 102. When the program sequence is run, it is first written to program memory 11 in step 111, after which the CPU module 1 reads and decodes the first program instruction at step 112. The CPU then determines whether the first two characters of the instruction name equal "Z_" (step 113), which identifies this instruction (also referred to as a program step) as a special function module (SFM) instruction. If this program step does not represent a special function module instruction, ordinary processing is performed at step 118. If the step does represent an SFM instruction, the CPU module 1 then stores the instruction contents in the two-port memory 41 (step 114) for the special function module 4, which is identified within the instruction. As noted above, the instruction designates the module by specifying the I/O position number at which the module is installed. The CPU also transfers any data stored in the device memory 12 specified by the SFM instruction to the two-port memory 41 (step 115). Thereafter, the CPU sends an interrupt signal to the designated special function module 4 as an execution command (step 116).

Once the module 4 recognizes this interrupt (step 121, FIG. 4c), it reads the special function module instruction stored in the two-port memory 41 (step 122), and determines (step 123) whether that instruction is valid (i.e. that the instruction contents have been predefined by that special function module and contain the appropriate instruction name). If the command is not valid (i.e. the SFM instruction name does not correspond with the predefined names within the special function module, as would occur in the case of FIG. 3c), the module 4 recognizes an error and performs error processing (step 127). Otherwise, module 4 decodes and executes the instruction (steps 124 and 125). If the instruction is of the type which requires device data, module 4 also reads and processes the device data from two-port memory 41 (step 125). Thereafter, the module 4 stores information to be read by the CPU in the two-port memory 41 (step 126), such as resultant/return data, error data (if a fault occurred; designated by a "1" in FIG. 3c) and/or information indicating that the module operated without fault (designated by a "0" in FIGS. 3).

Next, the CPU module 1 performs predetermined processing (step 117) in accordance with the results of the designated module 4's execution. This predetermined processing includes, for example, no operation (if the instruction has been performed without fault), an error display (if the instruction resulted in an error), and/or data transfer to the device memory 12 (if data is returned to the CPU 1). Thereafter, the CPU loops to step 112 and repeats the above process for the next program step.

In the preferred embodiments, within the two-channel D/A module (a special function module having two D/A facilities), Z_ANALOG_1 has been defined as an instruction for outputting an analog value to the first channel and Z_ANALOG_2 as an instruction for outputting an analog value to the second channel. Similarly, within the eight-channel D/A module (a special function module having eight D/A facilities), Z_ANALOG_1 has been defined as an instruction for outputting an analog value to the first channel and Z_ANALOG_2 as an instruction for outputting an analog value to the second channel. In addition, it is assumed that in the display module, Z___LOCATE has been defined as an instruction for specifying a display position and Z___PRINT (see instruction 7c in FIG. 1) has been defined as a displaying instruction.

With the above configuration, a program for outputting an analog value corresponding to the contents of device D0 to the first channel, with a two-channel D/A module installed in the position of input/output number 50, will now be considered.

In this case, the program step 7A (FIG. 2) is created by the user via the programming device 2 and written to the program memory 11 of the CPU module 1 via the communication cable 3 as one of the program instructions. During operation, as noted above, the CPU module 1 determines whether the first two characters of the instruction name are "Z_". The CPU module 1 then stores the contents of D0 (the device memory 12 specified by program step 7A), in the two-port memory 41 of the two-channel digital-to-analog module installed in I/O position 50. At the same time, CPU generates an interrupt signal for the two-channel digital-to-analog module. Once this interrupt is recognized, the two-channel digital-to-analog module checks whether the special function module instruction "Z_ANALOG_1" stored in the two-port memory 41 corresponds to an instruction defined by the two-channel digital-to-analog module. If this is a valid instruction, the two-channel digital-to-analog module outputs to the first channel an analog value corresponding to the contents of device D0 of the device memory 12, which was stored in the two-port memory 41.

This "Z_ANALOG_1" instruction may also be used for commanding an eight-channel D/A module installed in I/O position 50 to output an analog value to the first channel, wherein the analog value corresponds to the contents of device D0. This dual use of an instruction is acceptable in this case since either 2-channel or 8-channel D/A modules are capable of performing this operation. Thus, program step 7A still only has one purpose; namely to perform D/A conversion on the contents of device D0 and supply the results to the first channel of an SFM module.

It will be recognized that the programming unit 2 and CPU module 1 connected by the communication cable 3 in the embodiment may be connected directly without the communication cable. Alternatively, the programming unit 2 may be connected via the communication cable 3 to a special function module for communication. Furthermore, any of the special function modules 4 may be used as the programming unit 2. It will also be appreciated that the special function module instruction defined as having the instruction name beginning with "Z_" may use a different indicator as long as the CPU recognizes this indicator to identify the instruction as special.

Intermediate codes converted from instruction names, etc. and stored in the program memory may also be employed to determine whether any instruction is a special function module instruction or not, in lieu of Z_ defined as the criterion determining the special function module instruction.

Further, while the CPU module generates an interrupts to request the special function module 4 to execute an instruction, a flip-flop or other device (not illustrated) may be set by the CPU module 1 and polled by the special function module 4 to determine whether an execution request has been given. Alternatively, an execution request code may be written by the CPU module 1 to the two-port memory 41 in the special function module 4 and polled by the special function module 4 to determine whether an execution request has been given.

A second embodiment of the present invention will now be discussed with reference to FIGS. 9a–9d and 10. In this embodiment, rather than simply "ship out" an instruction executable at a special function module, the CPU performs some instruction processing itself.

FIGS. 9a to 9d illustrate examples of the structures (information on special function module-corresponding instructions) of memories 41 accessible from both the CPU module and special function modules. FIGS. 9a to 9d set forth exemplary memory structures 41AB, 41BB, 41CB and 41DB, respectively, for different special function modules, wherein each memory address is represented by a byte location. Memory for each special function module is configured in this format. Address 0 stores the total number of special function module-corresponding instructions 420 (FIG. 9a) defined for the corresponding module. The addresses thereafter store information on each special function module-corresponding instruction.

This information will now be described, taking the first instruction 421 by way of example. An instruction name 421a of the first special function module instruction is stored as a character code beginning at address 1 (FIG. 9a uses addresses 1–10 to store this code). The number of device memories 421b defined by this instruction is stored thereafter at address 11, and the corresponding available ones of the device memories are stored at address 12 after being converted into a code. Thus, if there are three devices designated in 421b, then 421c lists three device types. Read/write segmentation 421d is stored at address 13, the head address 421e of the buffer memory to be accessed is stored at address 14, and the number of data words transferred 421f is stored at address 15. A handshake signal which must be generated by the CPU module at the time of information transfer and its ON/OFF state 421g are stored at address 16, and a flag 421h (indicating whether the instruction can be executed or not) is stored at address 17.

The information of one instruction is thus indicated as an information set 421 comprising elements 421a to 421h. The memory locations following address 17 store similar information for each of the special function module-corresponding instructions defined (the number of which is stored at address 0). Structural examples of the memory 41 in the case of a two-channel digital-to-analog converter module 41BB, an eight-channel digital-to-analog converter module 41CB, and a display module 41DB are illustrated in FIGS. 9b–9d, respectively.

Figure 10:
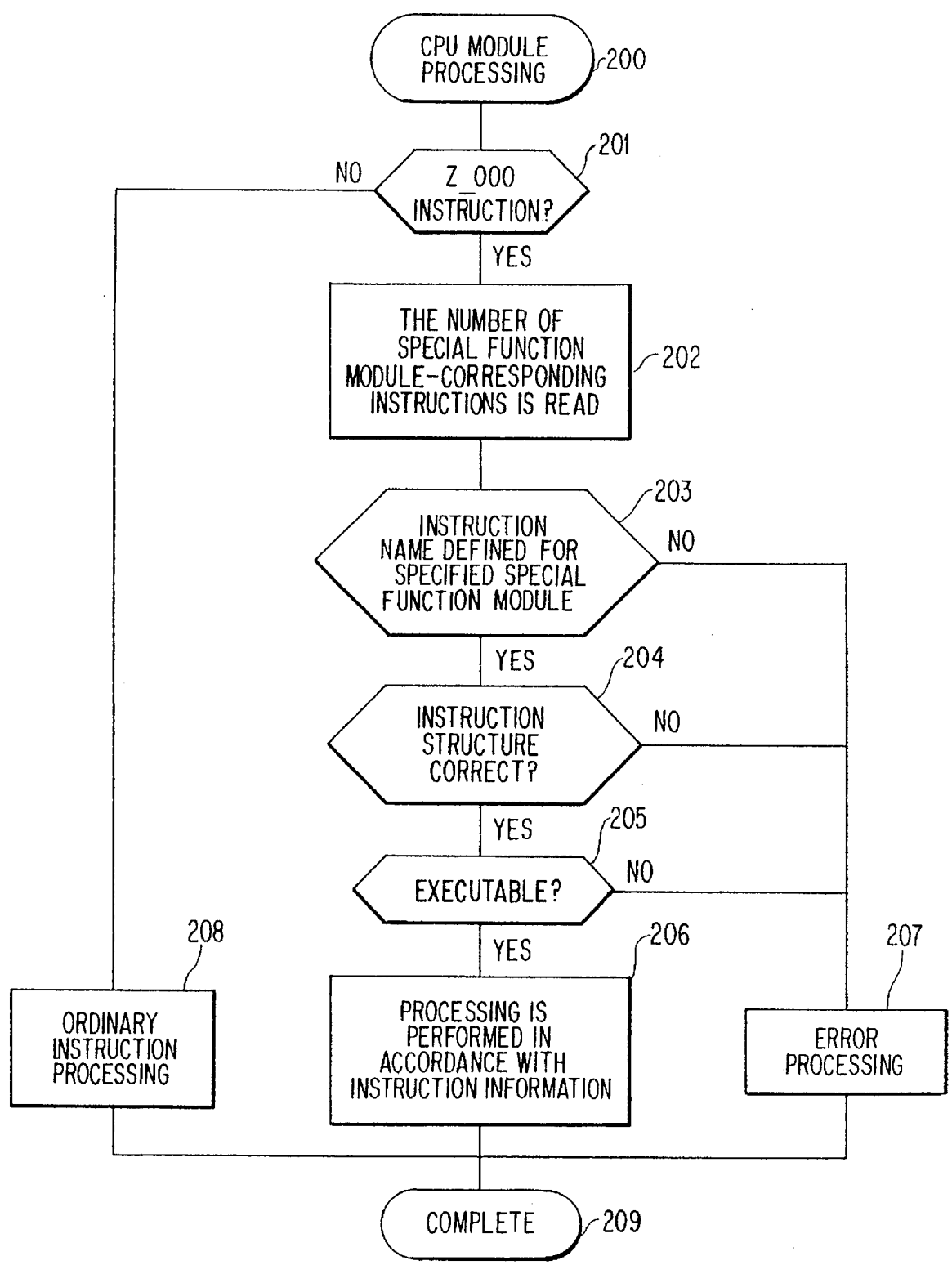
FIG. 10 is a flowchart showing a sequence of the programmable controller operation for a second embodiment.

FIG. 10 is a flowchart illustrating a processing sequence performed by the CPU module when it executes the special function module instructions set forth in FIGS. 9a–9d.

When "Z_" is entered at the beginning of a program writing sequence by using the programming device 2, the device thereafter allows the user to enter any instruction name. The user then creates program steps in the format shown in FIG. 1 employing the programming device 2, and writes this program to the program memory 11 of the CPU module 1 via the communication cable 3. Subsequently, the CPU module 1 runs the sequence program written to the program memory 11 thereof.

First, at step 201 (FIG. 10), the CPU module 1 determines whether the instruction is a special function module instruction by identifying whether the first two characters of the name thereof are "Z_". If not, ordinary sequence processing, (i.e. processing of an ordinary instruction), is performed at step 208. If a "Z_" is found, the CPU module 1 reads (at step 202) the number of instructions 420 (FIG. 9a) defined for this module from the special function module instruction information stored in the two-port memory 41 as a multidirectional access memory. The two-port memory 41 is provided in the special function module 4A (FIG. 5) installed in the position corresponding to the input/output number specified by the special function module instruction and is accessible from both the CPU module and special function module. The CPU searches memory 41 for an instruction which matches the character code that followed the "Z_" (identified in step 201), from among the special function module instructions and determines whether that instruction has been defined for this special function module. If a matching instruction is not found, the CPU module 1 regards this instruction name as being undefined in the special function module, and thus identifies this name as an error, and performs error processing at step 207. If a corresponding instruction is found, the CPU module 1 regards that instruction as being defined and progresses to the next processing step.

At step 204, the CPU module 1 determines whether the information necessary to execute the named instruction has been defined (i.e. whether the structure of that instruction is correct for the intended special function module). This necessary information includes the number of device memories and their types. The number of device memories is designated by listing each device memory in area 72 of the instruction (FIG. 1), wherein each of these device memories types designate the available device memory in a code (F5H, F6H, etc.). If the structure of the instruction is correct, the CPU module 1 checks whether the instruction can be executed or not based upon the execution checking flag at step 205.

If it is executable, the CPU module 1 performs processing at step 206 according to the special function module instruction information, such as read/write segmentation, the read/write head address, data words transferred, and the handshake signal (device memory to be switched on/off at the time of instruction execution and its ON/OFF state). If the instruction cannot be executed, an error will occur and predetermined error processing is performed at step 207. After processing has finished without a fault or error processing, such as a display error, the processing of the named instruction is completed at step 209. Thereafter, operation returns to step 201 and proceeds to execute the next instruction.

In this embodiment it is assumed that Z_ANALOG_1 has been defined as an instruction for outputting an analog value to the first channel (in the case of, for example, a special function module having two digital-to-analog conversion facilities), and the instruction name Z_ANALOG_2 has been defined as an instruction for outputting an analog value to the second channel. Similarly, it is assumed that in the eight-channel digital-to-analog converter module (a special function module having eight digital-to-analog conversion facilities), Z_ANALOG_1 has been defined as an instruction for outputting an analog value to the first channel and Z_ANALOG_2 as an instruction for outputting an analog value to the second channel. The name Z_ANALOG_8 has been defined as an instruction for outputting an analog value to the eighth channel of the 8-channel D/A module. In addition, it is assumed that LOCATE has been defined as an instruction for specifying a display position and PRINT as a displaying instruction within the display module.

At this time, a program for outputting an analog value corresponding to the contents of device D0 to the first channel, will now be considered, with a two-channel digital-to-analog module installed in the I/O position 50.

The user creates the program step 7A (FIG. 2) with the programming device 2 and writes it to the program memory 11 of the CPU module 1 along with other instructions. Later, at the time of execution, the CPU checks that the first two characters of the name of that instruction are Z_ to determine whether it is a special function module instruction. The CPU module 1 then reads the number of special function module instructions 430 (FIG. 9*b*) stored in the two-port memory 41 in the case of the two-channel digital-to-analog module installed in I/O position 50 (FIG. 2) specified by that instruction. Assuming that four special function module instructions have been defined for that module (see FIG. 9*b*), the CPU module 1 checks the character codes of the four instructions sequentially. In the instant case, the correct name is stored in the first position 431. Thus processing is performed in accordance with this first special function module instruction information.

This information indicates that this instruction specifies one device memory 431*b* with a device type F5E. The CPU module 1 compares that information with the contents of D0 in the program memory 11 (FIG. 5) to determine whether the information matches. The CPU module 1 then reads the read/write segmentation 431*d*, the buffer memory head address 431*e*, the number of data words transferred 431*f*, the handshake signal 431*g* and the execution check flag 431*h*, and identifies the instruction as one for writing the contents of D0 in the device memory 12 to address 2 of the buffer memory. The CPU executes the instruction in accordance with the state of the execution checking flag (0=executable). The special function module, as usual, outputs to the first channel the analog value corresponding to the contents of D0 of the device memory 12.

In the case of outputting an analog value corresponding to the contents of device D0 to the first channel of an eight-channel digital-to-analog module installed in the position of input/output number 50, (program step 7A in FIG. 2) a completely analogous instruction executing operation is performed.

Thus, the special function module instruction having a similar function has the same instruction name, Z_ANALOG_1, and the instruction name readily indicates that it is an instruction for outputting an analog value.

It will be apparent that the processes of the present invention allow programs to be written without being conscious of the memory addresses of the two-port memories in the special function modules. The operating instructions given to the special function modules are readily identified, the program readability is enhanced, and design efficiency and maintenance efficiency are improved. Further, the present invention permits appropriate special function module instructions to be provided without affecting the CPU module if the number of special function module types increases.

It will be recognized that the bidirectional access memory is not limited to the two-port memory exemplified in the above embodiments and may be replaced by an ordinary memory used with a hardware select switch to select between the data and address bus belonging to the CPU unit 1 and those belonging to the special function unit 4.

It will also be apparent that the invention, as described above, achieves a programmable controller controlling process which allows the CPU unit to run a program having a step in an instruction format employing a symbol indicating a special function unit-corresponding instruction and a symbol denoting a special function type independently of memory addresses and to determine the special function unit corresponding instruction, and permits the special function unit to decode and execute the contents of said instruction. This controlling process therefore allows programs to be written without the user being conscious of the memory addresses of the special function units. This process also allows easy identification of the object to be controlled based upon the instruction format and provides high program readability, and ensures high efficiency in program design and maintenance.

What is claimed is:

1. A process for controlling a control unit including a CPU unit for conducting program sequence control and special function units for performing special function control in accordance with commands from said CPU unit, comprising steps of:

creating a program having at least one instruction step which includes a function-symbol indicating a special function unit-corresponding instruction and a type-symbol denoting a special function type, said function-symbol and said type-symbol being independent of an address of said at least one instruction step;

storing said program into a program memory; and executing each instruction in said program, said executing step comprising:

determining whether a current instruction from said program corresponds to one of said special function units, based on said function symbol and said type symbol of said current instruction.

2. The process of claim 1, wherein said execution step further comprises:

storing said current instruction in a multi-directional access memory of a corresponding one of said special function units, if said current instruction is determined to correspond to one of said special function units; and requesting said one of said special function units to execute said current instruction.

3. The process of claim 2, wherein said execution step further comprises:

decoding and executing contents of said current instruction in said one of said special function units after said request is made, based upon said type-symbol denoting the special function type of said instruction step stored in said multi-directional access memory.

4. The process of claim 3, wherein said decoding and executing step further includes determining whether a content of said current instruction is defined within said special function unit by comparing said type-symbol from said current instruction with types stored in said special function unit.

5. The process of claim 2, wherein said storing step includes storing instructions and any corresponding data from said program memory in said multi-directional access memory of said one of said special function units.

6. The process of claim 1, wherein said execution step initially identifies whether said current instruction corresponds to a special function unit instruction by identifying a unique character code within an instruction name.

7. The process of claim 1, wherein said determination step compares an instruction name of said current instruction with a predefined valid instruction name in the special function module to determine whether said instruction corresponds with said module.

8. A process for controlling a control unit including a CPU unit for conducting program sequence control and special function units for performing special function control in accordance with commands from said CPU unit, comprising the steps of:

storing instruction information corresponding to said special function units into memory provided in said special function units and accessible from said CPU unit;

creating a program having at least one instruction step which includes a function-symbol indicating a special function unit-corresponding instruction and a type-symbol denoting a special function type, said function-symbol and said type-symbol being independent of an address of said at least one instruction step;

storing said program into a program memory;

executing each instruction in said program, said executing step comprising:

determining whether a current instruction from said program corresponds to one of said special function units, by checking for said function symbol and said type symbol, and checking whether said current instruction is valid on said one of said special function units, by reading said instruction information stored in said memory of said one of said special function units, and requesting said one of said special function units to execute said instruction step according to said instruction information when the instruction information matches the content of said instruction step; and executing said instruction according to said instruction information stored in said memory in said one of said special function units.

* * * * *